US010730241B2

(12) United States Patent
Schmidt

(10) Patent No.: US 10,730,241 B2
(45) Date of Patent: Aug. 4, 2020

(54) TECHNIQUES FOR AUTOMATICALLY PLACING ESCAPE HOLES DURING THREE-DIMENSIONAL PRINTING

(71) Applicant: AUTODESK, INC., San Rafael, CA (US)

(72) Inventor: Ryan Michael Schmidt, Toronto (CA)

(73) Assignee: Autodesk, Inc., San Rafael, CA (US)

( * ) Notice: Subject to any disclaimer, the term of this patent is extended or adjusted under 35 U.S.C. 154(b) by 1298 days.

(21) Appl. No.: 14/544,034

(22) Filed: Nov. 17, 2014

(65) Prior Publication Data

US 2016/0136883 A1    May 19, 2016

(51) Int. Cl.
*B29C 64/386* (2017.01)
*B33Y 50/00* (2015.01)

(52) U.S. Cl.
CPC ............ *B29C 64/386* (2017.08); *B33Y 50/00* (2014.12)

(58) Field of Classification Search
CPC ..... B29C 64/386; B29C 64/393; B29C 64/00; B29C 64/194
See application file for complete search history.

(56) References Cited

U.S. PATENT DOCUMENTS

| | | | | |
|---|---|---|---|---|
| 2015/0269290 A1* | 9/2015 | Nelaturi | .............. | G06F 17/5009 703/6 |
| 2016/0059489 A1* | 3/2016 | Wang | ...................... | H04L 67/16 700/119 |
| 2018/0072040 A1* | 3/2018 | Mark | .................... | B29C 64/386 |

OTHER PUBLICATIONS

"7 Essential Tricks to Prepare Your 3D Model for 3D Printing." 3D Printing Blog, I.materialise, Aug. 21, 2014, i.materialise.com/blog/en/the-printable-3d-design-checklist-common-design-flaws-and-how-to-fix-them/. (Year: 2014).*

"Creating Hollow Objects." Wayback Machine Generated NPL, Shapeways, Sep. 13, 2013, www.shapeways.com/tutorials/creating-hollow-objects. (Year: 2013).*

(Continued)

*Primary Examiner* — Robert C Dye
*Assistant Examiner* — Taryn Trace Willett
(74) *Attorney, Agent, or Firm* — Artegis Law Group, LLP

(57) ABSTRACT

In one embodiment of the present invention, an escape hole generator creates escapes holes designed to facilitate removal of support and/or unprinted material generated inside enclosed hollows of three-dimensional (3D) digital models during 3D printing. In operation, the escape hole generator identifies a hollow included in the three-dimensional model and then selects optimized locations for escape holes. Notably, the escape hole generator selects the locations to optimize placement heuristics, such as favoring locations closer to the bottom of the 3D model, while satisfying escape hole constraints (e.g., hole size and spacing requirements). The escape hole generator then perforates the hollow at the selected locations with geometries that provide channels from the outer surface of the hollow to the outer surface of the hollow. Advantageously, automating escape hole generation enables efficient creation of hollowed 3D models that reduce 3D printing time and material usage compared to solid 3D model counterparts.

16 Claims, 7 Drawing Sheets
(2 of 7 Drawing Sheet(s) Filed in Color)

(56) References Cited

OTHER PUBLICATIONS

How to Prepare your Render/Animaion Model for 3D Printing. Wayback Machine Generated NPL, Shapeways, Mar. 25, 2014, www.shapeways.com/tutorials/how-to-prepare-your-render-animation-model-for-3d-printing. (Year: 2014).*

How to Create Escape Holes for 3D Printing. YouTube Video, Shapeways, Aug. 11, 2014, https://www.youtube.com/watch?v=dxAWgOhWAp8. (Year: 2014).*

* cited by examiner

TECHNIQUES FOR AUTOMATICALLY PLACING ESCAPE HOLES DURING THREE-DIMENSIONAL PRINTING

BACKGROUND OF THE INVENTION

Field of the Invention

Embodiments of the present invention relate generally to computer processing and, more specifically, to techniques for automatically placing escape holes during three-dimensional printing.

Description of the Related Art

A three-dimensional (3D) printer generates a 3D object based on a 3D printable digital model, such as a 3D mesh of triangles. Typically, a 3D printer interprets a single, closed 3D mesh as delineating a solid component of the model. However, since the amount of material or time required to print many solid 3D objects may be unacceptable large/long, the designer often modifies the single closed 3D mesh to delineate one or more hollow components or regions.

To "hollow" the 3D model, the designer creates an inner shell that is separated from the single, closed 3D mesh (the outer shell) by the desired wall thickness. The 3D printer interprets the combination of inner shell and outer shell as a hollow component, and leaves the interior of the inner shell empty or filled with unprinted material. For instance, resin-based stereolithography printers fill hollow components with uncured resin. Similarly, fused-powder-style printers fill hollow components with powder, and fused deposition modeling printers often fill hollow components with dissolvable support material.

Removing the unprinted material encased in hollow components is desirable for multiple reasons. For instance, unprinted material that is not removed adds weight to the model, may cause post-processing visual defects (e.g. uneven dying), and is unable to be recycled for future use. Further, many 3D printers will not print hollow components that are fully enclosed, rejecting the 3D model or printing solid components in lieu of the fully enclosed hollow components. Consequently to enable the release of the unprinted material enclosed in hollow components, the designer modifies the 3D model to specify tiny holes, known as "escape" holes that perforate each hollow component.

In one approach to adding escape holes to a 3D model, a designer attempts to manually modify the 3D model via an interactive, graphical user interface (GUI)—based modeling tool. With such tools, for each desired escape hole, the designer creates a channel between the inner shell and outer shell. The designer then visual inspects the 3D model, ensuring that the created channel fully breaches the hollow component and complies with 3D printer-specific escape hole constraints, such as minimum hole size. With this approach, the designer often iterates each time he/she creates an escape hole—fine-tuning the escape hole based on the visual representation of the 3D model in the GUI until the desired escape hole is correctly represented by the 3D grid. As is clear, such a process is time consuming, tedious, and error-prone. Further, since automated flows are often used to generate 3D models and GUI-based modelling tools are not widely available for such flows, this GUI-based approach to adding escape holes has limited applicability.

As the foregoing illustrates, what is needed in the art are more effective techniques for generating escape holes to create hollow components or regions during 3D printing.

SUMMARY OF THE INVENTION

One embodiment of the present invention sets forth a computer-implemented method for automatically placing one or more escape holes when printing a three-dimensional model. The method includes identifying a hollow region of a three-dimensional model; determining a first location for a first escape hole based on the hollow region, an initial heuristic, and one or more escape hole constraints; and generating the first escape hole to provide a channel from the interior of the hollow region to the exterior of the hollow region at the first location.

One advantage of the disclosed approach is that the automated creation of escape holes enables efficient generation of 3D models that fully leverage the capabilities of 3D printers to minimize both the printing time and material dedicated to generating 3D models. In particular, the disclosed techniques ensure compliance with escape hole constraints enforced by the 3D printer, such as a minimum number of escape holes per hollow, without relying on user-interaction. Consequently, these techniques facilitate comprehensive automation of hollowing flows, dramatically reducing the required design time compared to conventional flows that include manual, interactive steps to perforate hollow components or regions with appropriate escape holes.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments. The patent or application file contains at least one drawing executed in color. Copies of this patent or patent application publication with color drawing(s) will be provided by the Office upon request and payment of the necessary fee.

DETAILED DESCRIPTION

In the following description, numerous specific details are set forth to provide a more thorough understanding of the present invention. However, it will be apparent to one of skill in the art that the present invention may be practiced without one or more of these specific details.

System Overview

Figure 1:
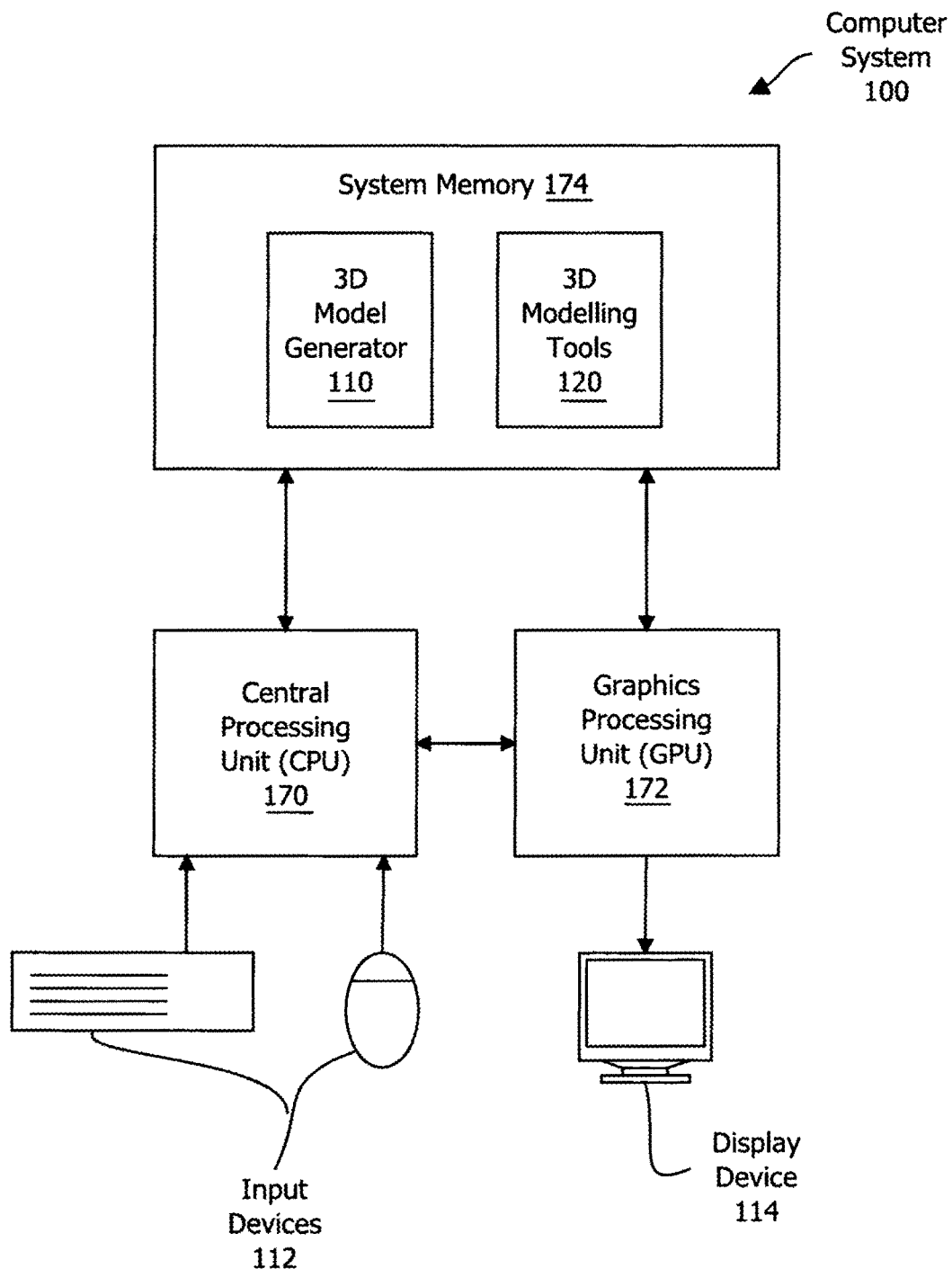
FIG. 1 is a block diagram illustrating a computer system configured to implement one or more aspects of the present invention.

FIG. 1 is a block diagram illustrating a computer system 100 configured to implement one or more aspects of the present invention. As shown, the computer system 100 includes, without limitation, a central processing unit (CPU) 170, a system memory 174, a graphics processing unit (GPU) 172, input devices 112, and a display device 114. The CPU 170 receives input user input information from the input devices 112, such as a keyboard or a mouse. In operation, the CPU 170 is the master processor of the computer system 100, controlling and coordinating operations of other system components. In particular, the CPU 170 issues commands that control the operation of the GPU 172. The GPU 172 incorporates circuitry optimized for graphics and video processing, including, for example, video output circuitry. The GPU 172 delivers pixels to the display device 114 that may be any conventional cathode ray tube, liquid crystal display, light-emitting diode display, or the like. In various embodiments, GPU 172 may be integrated with one or more of other elements of FIG. 1 to form a single system. For example, the GPU 172 may be integrated with the CPU 170 and other connection circuitry on a single chip to form a system on chip (SoC).

The system memory 174 stores content, such as software applications and data, for use by the CPU 170 and the GPU 172. As shown, the system memory 174 includes a 3D model generator 110 and additional 3D modelling tools 120. The 3D model generator 110 and the 3D modelling tools 120 are software applications that execute on the CPU 170, the GPU 172, or any combination of the CPU 170 and the GPU 172. The 3D model generator 110 enables specification of a 3D model. The 3D modelling tools 120 include a variety of software applications that provide interactive and/or batch processing of 3D models to facilitate 3D printing. Notably, the 3D modeling tools 120 automate both hollowing of 3D models and generating escape holes for the hollowed 3D models.

In alternate embodiments, the system memory 174 may not include the 3D model generator 110 and the 3D modelling tools 120. In other embodiments, the 3D model generator 110 and/or any number of the 3D modelling tools 120 are integrated into any number (including one) of other software applications. In some embodiments, the 3D model generator 110 and/or any number of the 3D modelling tools 120 may be provided as an application program (or programs) stored on computer readable media such as a CD-ROM, DVD-ROM, flash memory module, or other tangible storage media.

The components illustrated in the computer system 100 may be included in any type of computer system 100, e.g., desktop computers, server computers, laptop computers, tablet computers, and the like. Additionally, software applications illustrated in computer system 100 may execute on distributed systems communicating over computer networks including local area networks or large, wide area networks, such as the Internet. Notably, the 3D modelling tools 120 described herein are not limited to any particular computing system and may be adapted to take advantage of new computing systems as they become available.

It will be appreciated that the computer system 100 shown herein is illustrative and that variations and modifications are possible. The number of CPUs 170, the number of GPUs 172, the number of system memories 174, and the number of applications included in the system memory 174 may be modified as desired. Further, the connection topology between the various units in FIG. 1 may be modified as desired.

Figure 2:
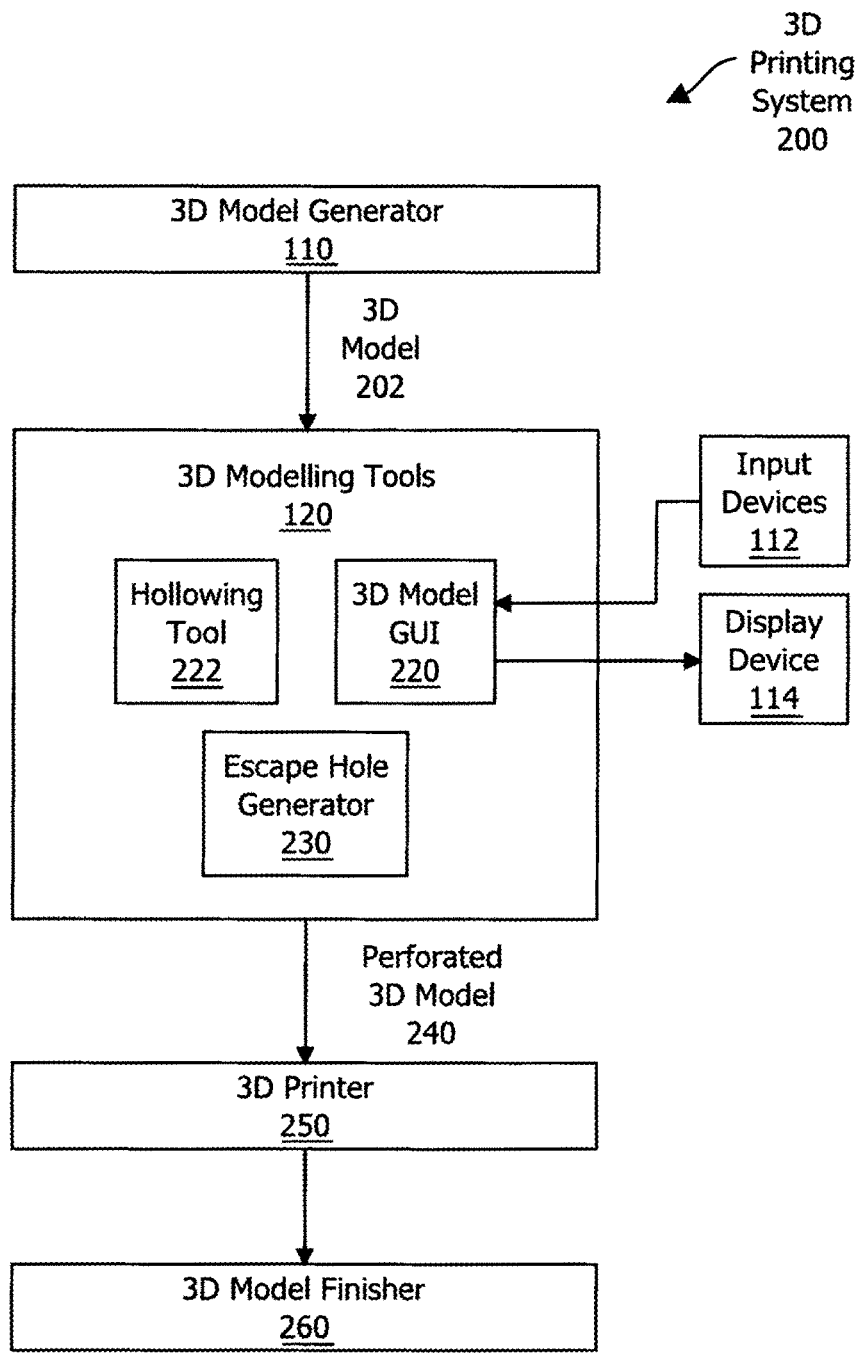
FIG. 2 is a block diagram illustrating a three-dimensional (3D) printing system controlled by the computer system of FIG. 1 and configured to implement one or more aspects of the present invention.

FIG. 2 is a block diagram illustrating a three-dimensional (3D) printing system 200 controlled by the computer system 100 of FIG. 1 and configured to implement one or more aspects of the present invention. As shown, the 3D printing system 200 includes, without limitation, the 3D model generator 110, the 3D modelling tools 120, a 3D printer 250, and a 3D model finisher 260. As shown in FIG. 1, the 3D model generator 110 and the 3D modelling tools 120 are included in the system memory 174 of the computer system 100 and execute on the CPU 170 and/or the GPU 172.

In operation, the 3D model generator 110 enables specification of a 3D model 202 that describes a 3D object. The 3D model generator 110 may be implemented in any technically feasible fashion. For instance, the 3D model generator 110 may include computer aided design (CAD) software. Such CAD software often includes a graphical user interface that converts designer input such as symbols and brush stroke operations to geometries in the 3D model 202. Alternatively the 3D model generator 110 may be a 3D scanner that analyzes an existing 3D solid object to create the 3D model 202 as a digital template for creation of copies of the existing 3D object.

The 3D model 202 may conform to any 3D printable format as known in the art. For instance, in some embodiments the 3D model 202 may capture unit normal and vertices that define the 3D solid object in the stereolithograpy format. In other embodiments, the 3D model 202 may capture a 3D mesh of interconnected triangles that define the 3D object in the collaborative design activity (COLLADA) format. In alternate embodiments, the 3D model 202 is created manually and the 3D model generator 110 is not included in the 3D printing system 200.

As shown, the 3D model generator 110 is coupled to the 3D modelling tools 120. This coupling may be implemented in any technically feasible fashion, such as exporting the 3D model 202 from the 3D model generator 110 and then importing the 3D model 202 to the 3D modelling tools 120. As also shown, the 3D modelling tools 120 include, without limitation, a 3D model graphical user interface (GUI) 220, a hollowing tool 222, and an escape hole generator 230.

The 3D model GUI 220 is configured to receive designer input information from the input devices 112, such as a keyboard or a mouse. After the 3D modelling tools 120 process the designer input information in conjunction with the 3D model 202, the 3D model GUI 220 delivers pixels to the display device 114. The 3D modelling tools 120 are configured to continuously repeat this cycle, enabling the designer to dynamically interact with the 3D model 202 based on corresponding images on the display device 114.

One or more of the 3D modelling tools 120 may also include batch processing interfaces, enabling automation of design flows without manual intervention. In alternative embodiments, any number of the 3D modelling tools 120 may support only interactive processing or only batch processing. If the 3D modelling tools 120 support only batch processing, then the 3D model GUI 220 may be omitted from the computer system 100. The 3D modelling tools 120 includes a variety of automated tools that optimize the 3D model 202 to enable the 3D printer 250 to accurately, efficiently, and cost-effectively fabricate the 3D object.

To reduce the material and/or time required for the 3D printer 250 to generate the 3D object corresponding to the 3D model 202, the hollowing tool 222 is configured to convert solid, enclosed volumes in the 3D model 202 to hollow, enclosed volumes. For discussion purposes only, each enclosed volume is hereafter referred to as a "component" and the perimeter of each component is referred to as "outer shell," irrespective of whether the component is solid or hollow. To "hollow" a component, the hollowing tool 222 modifies the 3D model 202 to create an inner shell that is a scaled-down version of the outer shell and is separated from the outer shell by the desired object wall thickness. Notably, the hollowing tool 222 generates hollow components that do not include escape holes.

The hollowing tool 222 may be configured to hollow any number of solid components. In some embodiments, 3D model 202 may initially depict one or more hollow components or regions and the hollowing tool 222 does not modify these existing hollow components or regions. In alternate embodiments, the hollowing tool 222 is not included, but the 3D model 202 includes at least one hollow component or region that does not incorporate escape holes.

To allow escape of unprinted material from hollow components or regions, the 3D printer 250 typically enforces printer-specific escape hole requirements. Such escape hole requirements may include a minimum number of escape holes for each hollow component or region and a minimum escape hole width. The minimum escape hole width may vary based on the number of escape holes. If these printer-specific escape hole requirements are not met, then the 3D printer 250 may not print the 3D model as intended. For example, the 3D printer 250 may reject the 3D model 202 without generating a 3D object, or create a 3D object in which each non-compliant hollow component or region in the 3D model 202 is replaced with a solid counterpart. Advantageously, the escape hole generator 230 is configured to automate the process of modifying the 3D model to include escape holes in hollow components or regions. Not only does the escape hole generator 230 reduce the time required to design correctly printed hollow 3D components or regions, but the escape hole generator 230 also enables batch design flows to include automatic escape hole generation steps.

For each hollow component or region in the 3D model 202, the escape hole generator 230 selects optimized escape locations of the escape holes based on escape hole constraints of the 3D printer 250, user constraints, and placement heuristics. After selecting the escape locations of the escape holes, the escape hole generator 320 generates hole geometries—automatically determining hole geometries that, when removed from the 3D object, properly and optimally perforate the hollow components or regions. More specifically, for each escape hole, the escape hole generator 220 selects the general shape for the hole geometry, aligns the hole geometry along the surface normal of the inner shell, and ensures that the hole geometry completely covers the desired wall segment of the hollow component. Finally, the escape hole generator 230 performs a Boolean subtraction operation, subtracting the hole geometries from the 3D model 202 to create a perforated 3D model 240.

The 3D printer 250 is any device capable of additively printing a 3D object based on the perorated 3D model 240. The 3D printer 250 may be configured to build-up any type of 3D object in any technically feasible fashion. For instance, in some embodiments, the 3D printer 250 extrudes plastic, and the 3D printer 250 may be configured to print plastic replacement parts for tools based on blueprints expressed as perforate 3D models 240. In other embodiments, the 3D printer 250 generates live cells, and the 3D printer 250 may be configured to print organs, such as kidneys. The escape holes ensure that the 3D printer 250 correctly processes hollow components and regions, thereby reducing the material and time required to generate the hollowed 3D object compared to a solid version of the 3D object.

After the 3D printer 250 generates the top layer of the 3D object, unprinted material and any support material generated to ensure the integrity of the 3D object throughout the 3D printing process is unnecessary. Such unnecessary material needlessly adds weight to the 3D object as well as detracting from the aesthetic appeal and/or functionality of the 3D object. For this reason, the 3D model finisher 260 performs removal operations that remove the extraneous material from the 3D object, thereby revealing the 3D object specified by the perorated 3D model 240 unencumbered by the constraints of the manufacturing process. In some embodiments, the 3D model finisher 260 is a human who manually extracts unprinted material via the escape holes, and cuts away or peels off the support material. In other embodiments, the unprinted and the support material are water soluble, and the 3D model finisher 260 is a bath of water.

It will be appreciated that the system shown herein is illustrative and that variations and modifications are possible. The connection topology, including the number and arrangement of the 3D model generator 110, the 3D model GUI 220, the hollowing tool 222, the escape hole generator 230, the 3D printer 250, and the 3D model finisher 260, may be modified as desired. In certain embodiments, one or more components shown in FIGS. 1 and 2 may not be present. For instance, the 3D model generator 110, the 3D model GUI 220, and the hollowing tool 222 could be eliminated, and the escape hole generator 230 could receive a manually created file as input.

Lastly, the 3D model GUI 220, the hollowing tool 222, and the escape hole generator 230 may be implemented in any combination of software and hardware units. In some embodiments the escape hole generator 230 may be removed and the associated functionality may be incorporated into the hollowing tool 222. In other embodiments, a graphical user interface for the escape hole generator 230 is included in the 3D model GUI 220.

Figure 3:
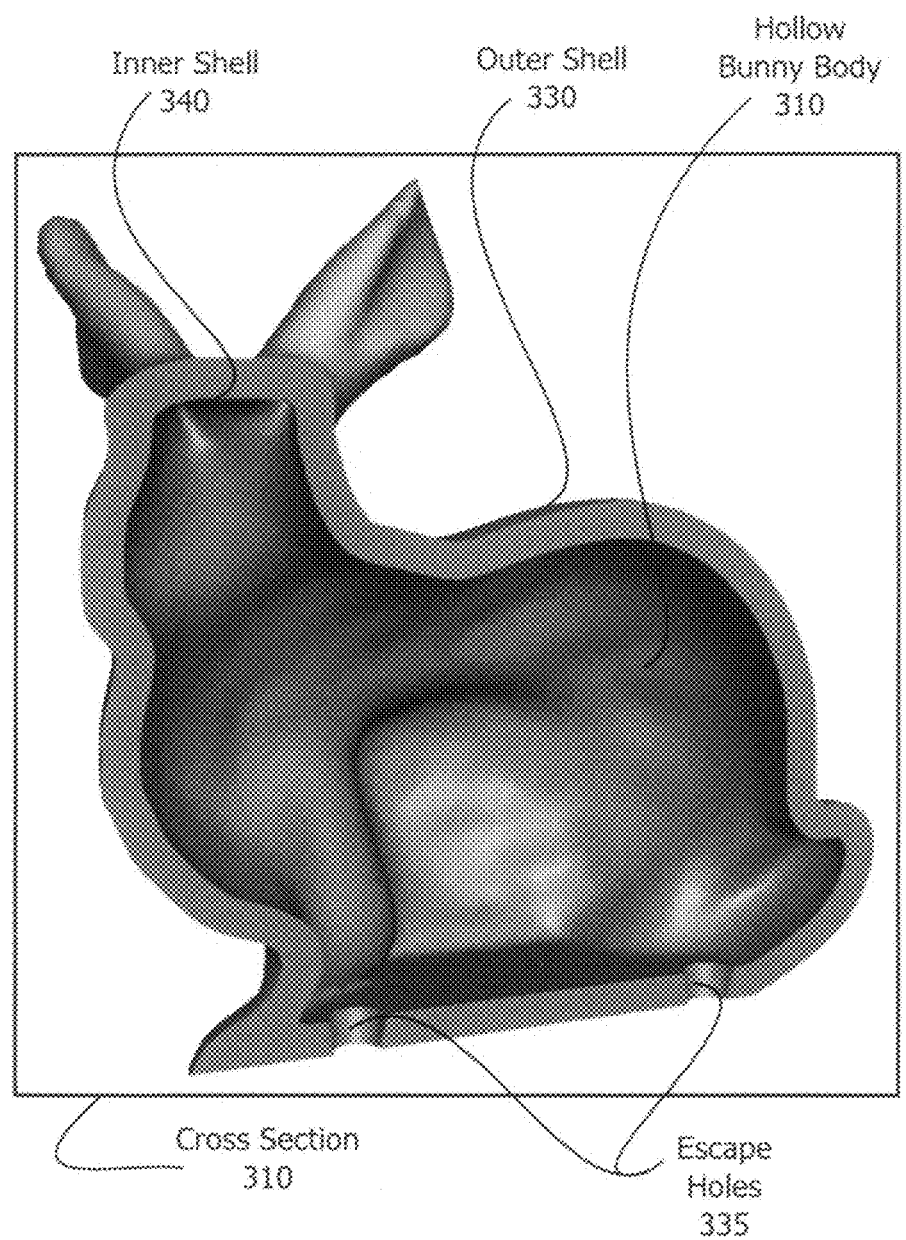
FIG. 3 is a conceptual diagram illustrating a cross section of a hollowed 3D model that is perforated with escape holes, according to one embodiment of the present invention.

FIG. 3 is a conceptual diagram illustrating a cross section 310 of a hollowed 3D model 202 that is perforated with escape holes 335, according to one embodiment of the present invention. For discussion purposes only, the context of FIG. 3 is that the designer generated the 3D model 202 of a bunny via the 3D model generator 110. The hollowing tool 222 3D received the 3D model 222 and converted the solid body of the bunny to a hollow "main" component of the body, shown as a hollow bunny body 310, and two solid "ear" components. The hollow bunny body 310 includes an outer shell 330 separated from an inner shell 340 at a uniform wall thickness. Subsequently, the escape hole generator 230 created the two escape holes 335 in the hollow bunny body 310. As shown, both of the escapes holes 335 breach the wall of the hollow bunny body 310, allowing unprinted and/or support material to escape from the hollow bunny body 310 of the generated 3D object.

Adding Escape Holes to a 3D Model

Figure 4:
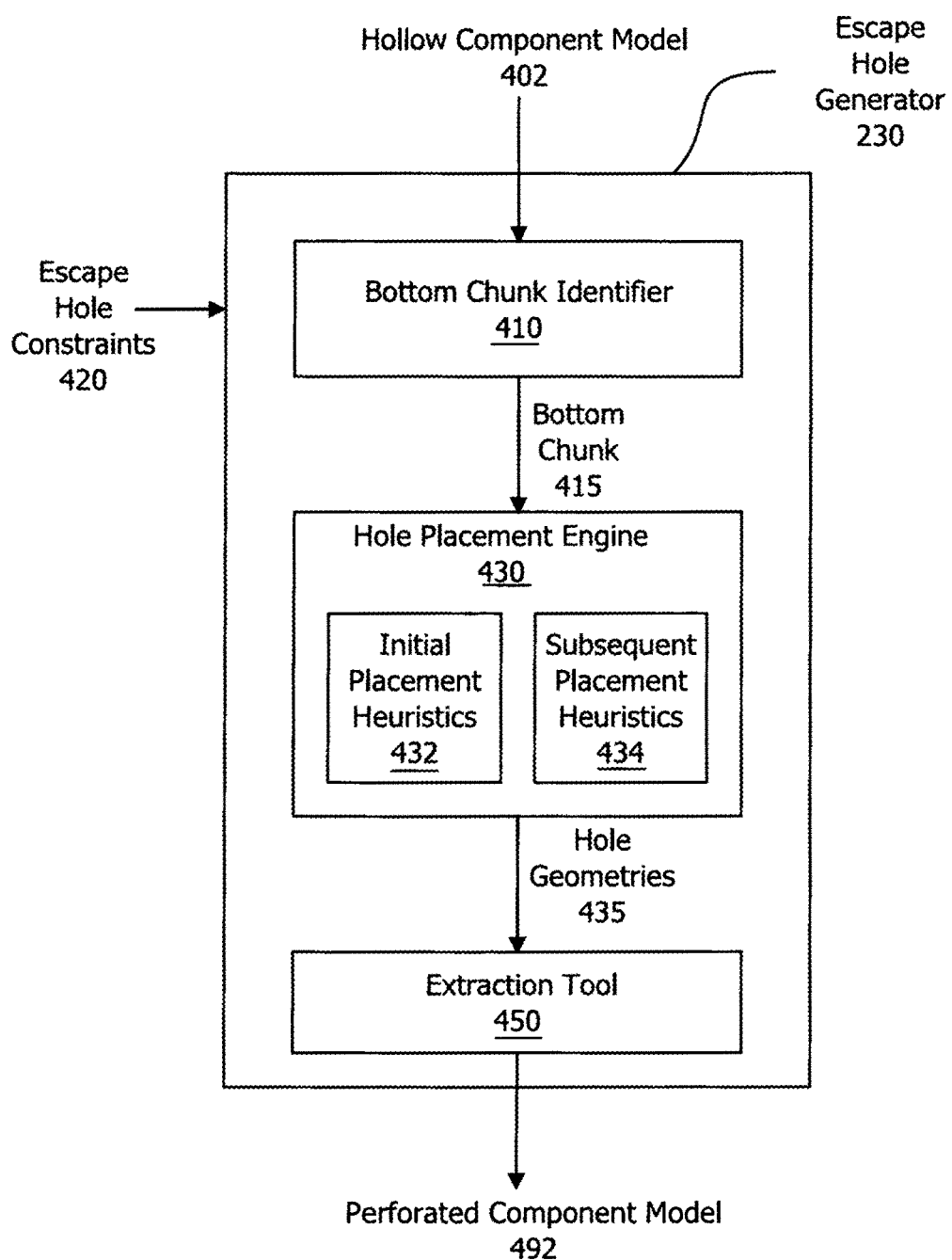
FIG. 4 is a conceptual diagram illustrating the escape hole generator of FIG. 2, according to one embodiment of the present invention.

FIG. 4 is a conceptual diagram illustrating the escape hole generator 230 of FIG. 2, according to one embodiment of the present invention. As shown, the escape hole generator 230 is configured to modify a hollow component model 402 to optimize the location and shape of escape holes 335 based on one or more escape hole constraints 420. The escape hole constraints 420 may be set in any technically feasible fashion and may reflect constraints of the 3D printer 250 and/or user preferences. As shown, the escape hole generator 230 includes, without limitation, a bottom chunk identifier 410, a hole placement engine 430, and an extraction tool 450.

For discussion purposes only, the escape hole generator 230 is described in terms of operating on the single hollow component model 402. Typically, the hollow component model 402 is included in the initial 3D model 202 or is generated by the hollowing tool 222. In alternate embodiments, the escape hole generator 230 may receive the 3D model 202, identify any number of hollow components or regions in any technically feasible fashion, and then generate one or more escape holes 335 for each of these hollow components or regions. In some embodiments, the functionality of the escape hole generator 230 may be added to the hollowing tool 222, and the escape hole generator 230 may be removed from 3D printing system 200.

In operation, the bottom chunk identifier 410 evaluates the hollow component model 402 in conjunction with the escape hole constraints 420, and identifies an optimized region of the hollow component model 402 to perforate with the escape holes 335, shown as bottom chunk 415. The escape hole constraints 420 may represent any number of constraints imposed by the 3D printer 250 and/or any number of user preferences. Typically, the escape hole constraints 420 include a "holes per hollow" and a "hole radius." The bottom chunk 415 is a region that spans from the vertically lowest point of the hollow component model 402 (i.e., the bottom) to a uniform vertical height of the hollow component model 402. Thus, the bottom chunk 415 represents a bottom-most portion of the hollow component model 402. The bottom chunk identifier 410 sets the height of the bottom chunk 415 to the smallest value that provides sufficient surface area for the specified number and size of escape holes 335.

For example, suppose that the bottom of the hollow component model 402 is a flat surface that is capable of accommodating the specified escape holes 335. In such a scenario, the bottom chunk identifier 410 sets the height of the bottom chunk 415 to a smallest values (such as 0.1% of the height of the hollow component model 402) to ensure that the escape holes 335 are placed on the bottom of the hollow component model 402. By contrast, suppose that the entire surface area of the hollow component model 402 is unable to accommodate the specified escape holes 335. The bottom chunk 410 sets the height of the bottom chunk 415 to 100% of the height of the hollow component model 402 to enable the maximum number of escape holes 335 to be generated.

The bottom chunk identifier 410 may identify the bottom chunk 415 in any technically feasible fashion. In some embodiments, the bottom chunk identifier 410 identifies the bottom chunk 415 based on the following algorithm:

1) Set hole buffer size:
   HoleBufferSize = HoleRadius/2;
2) Determine diameter needed for a hole:
   HS = HoleRadius + 2*HoleBufferSize
3) Find smallest vertical region R of the hollow component model 402 that can contain the desired number of holes:
   i. Set vertical height to smallest:
      VH = 0.1% of the height of the hollow component model 402
   ii. Quickly guess at how many holes can fit in the bottom chunk 410 with vertical height VH. Note, 0.64 is the average fraction of volume that can be filled by randomly-packed spheres.
      HoleSurfaceArea ≈ π * (HS/2)$^2$
      NumberHolesThatFit ≈ 0.64 * (ChunkSurfaceArea / HoleSurfaceArea)
   iii. If (NumberHolesThatFit) >= specified "holes per hollow"

-continued

OR VH = 100% then Done
Else increase VH and repeat ii and iii.

In other embodiments the bottom chunk identifier 410 may select the bottom chunk 415 in any technically feasible fashion. In yet other embodiments, the bottom chunk identifier 410 may be replaced by any tool that identifies a region of the hollow component model 402 in which to place escape holes 335. In some embodiments, the bottom chunk identifier 410 may be omitted and the locations of the escape holes 335 may be positioned anywhere on the surface of the hollow component model 402.

After receiving the bottom chunk 415, the hole placement engine 430 selects optimized locations for escape holes 335 along the inner shell 340 of the bottom chuck 415, and creates hole geometries 435 that perforate the wall of the bottom chunk 415 at these optimized locations. Although the location of the escape holes 335 are presented in the context of the inner shell 340, the location of the escape holes may be specified in any consistent manner, such as the middle of the escape hole 335 or a position along the outer shell 330. In general, to guide the selection of the escape locations of the escape holes 335, the hole placement engine 430 implements placement heuristics.

For example, in some embodiments the escapes holes 335 are intended to drain melted wax from the interior of the bottom chunk 415 and the hole placement engine 430 is configured to favor placing escape holes 335 at the bottom of large internal cavities. In other embodiments, the hole placement engine 430 is configured to consider flat areas as relatively "good" areas for the escape holes 335, and areas where the inner opening of a hole would have very little clearance as relatively "bad" areas for the escape holes 335. In yet other embodiments, the hole placement engine 430 is configured to tailor the locations of the escape holes 335 based on user-defined preferences. For instance, in alternate embodiments, the user may define preferred areas for escape holes 335 via painted surface masks.

In operation, the hole placement engine 430 selects the optimized locations of the escape holes 335 sequentially. As shown, the hole placement engine 430 includes initial placement heuristics 432 and subsequent placement heuristics 434. The hole placement engine 430 selects the location for the first escape hole 335 in the bottom chunk 415 based on the initial placement heuristics 432 and the location for additional escape holes 335 based on the subsequent placement heuristics 434. The subsequent placement heuristics 434 typically incorporate the location of proceeding escape holes 335 as part of the computation of an optimized location for each subsequent escape hole 335.

For instance, in one embodiment, the hole placement engine 430 sets the location of the first escape hole 335 to the center of the bottom-most surface in the bottom chunk 415. The hole placement engine 430 then sequentially sets the location of each additional escape hole 335 to be geodesically (i.e., the shortest route in curved space) furthest from the previously selected locations of the escape holes 335.

In other embodiments, the hole placement engine 430 includes different initial placement heuristics 432 and/or subsequent placement heuristics 434 and, consequently, the locations of the escape holes 335 vary accordingly. For instance, the hole placement engine 430 may be configured to place the first escape hole 335 at the geodesic center of the bottom chunk 415 instead of the bottom-most surface. In alternate embodiments, the hole placement engine 430 may apply any number of algorithms to optimally select any number and locations of the escape holes 335.

After the hole placement engine 430 determines the optimized locations of the escape holes 335, the hole placement engine 430 generates the hole geometries 435 that, when removed from the bottom chunk 415, properly perforate the bottom chunk 415. Notably, the hole placement engine 430 generates the hole geometries 435 to create unobstructed channels from the inner shell 340 (i.e., the inside of the bottom chunk 415) to the outer shell 330 (i.e. the outside of the bottom chunk 415) at the optimized locations. Advantageously, the hole placement engine 430 automatically selects both the shape and depth of the hole geometries 435 to ease the removal of support and/or unprinted material.

For each hole, the hole placement engine 430 determines an initial shape and then modifies the shape to ensure that the shape optimizes the removal of the unprinted material—generating the hole geometry 435. The initial shape may be determined in any technically feasible fashion. For example, the initial shape be a simple cylinder that extends from the hole location on the inner shell 340 to the outer shell 330. In some embodiments, the hole placement engine 430 computes the appropriate shape based on the following algorithm:
1) Calculate the surface normal of the inner shell 340 at the hole location.
2) Use the surface normal to find a ray-intersection with the outer shell 330.
3) Set the axis of a cylinder to the ray-intersection and position the cylinder to extend from the inner shell 340 at the location of the escape hole 335 to the corresponding location on the outer shell 330.
4) Set the radius of the cylinder to the "hole radius" specified in the escape hole constraints 420.

In some embodiments, the hole placement engine 430 enables the user to interactively modify the hole radius and/or position via the 3D model GUI 220. Further, since the shape of each escape hole 335 correlates to the ease with which the unprinted material is removed, the hole placement engine 430 may enable the user to guide the determination of the initial shape and/or initial shape parameters. Notably, in some embodiments, the initial shape may be a truncated cone that has a radius at the inner shell 340 that is equal or larger than the radius at the outer shell 330, and the 3D model GUI 220 may enable the user to select a "taper angle."

As persons skilled in the art will recognize, to ensure that the appropriate portions of the wall of the bottom chunk 415 are removed, the hole placement engine 430 may create one or more hole geometries 435 that extend past the inner and/or outer shell 330 of the bottom chunk. Suppose, for example, that the hole placement engine 430 were to create a simple cylinder that extended from a point A on the inner shell 340 to a point B on the outer shell 330. Further, suppose that the surface of the bottom chunk 415 were curved at points A and B. In such a scenario, subtracting the simple cylinder from the bottom chunk 415 would result in some portion of the wall of the bottom chunk 415 remaining, reducing the effectiveness of the escape hole 335 represented by the simple cylinder.

For this reason, after determining the initial shape of each escape hole 335, the hole placement engine 430 automatically fine-tunes the corresponding hole geometry 435, ensuring that the depth of the escape hole 435 is sufficient to create an unobstructed channel. For instance, in some embodiments, the hole placement engine 430 offsets a simple cylinder hole geometry 435 that extends from end point A to end point B using the following strategy at both end points:
1) Perform a breadth-first search, capped at the "hole radius," from the triangle containing the end point, selecting all points that are geodesically connected to the endpoint and are contained in an infinite cylinder along the axis from A to B.
2) Extend the end point so that the end point includes all selected points.
3) Further extend the end point by a "buffer," such as 5% to avoid any numerical issues.

The extraction tool 450 then removes the hole geometries 435 from the hollow component model 402, creating a perforated component model 492. More specifically, for each of the hole geometries 435, the extraction tool 450 performs a Boolean subtraction of the hole geometry 435 from the hollow component model 402—"cutting out" the corresponding hole from the hollow component model 402.

Figure 5:
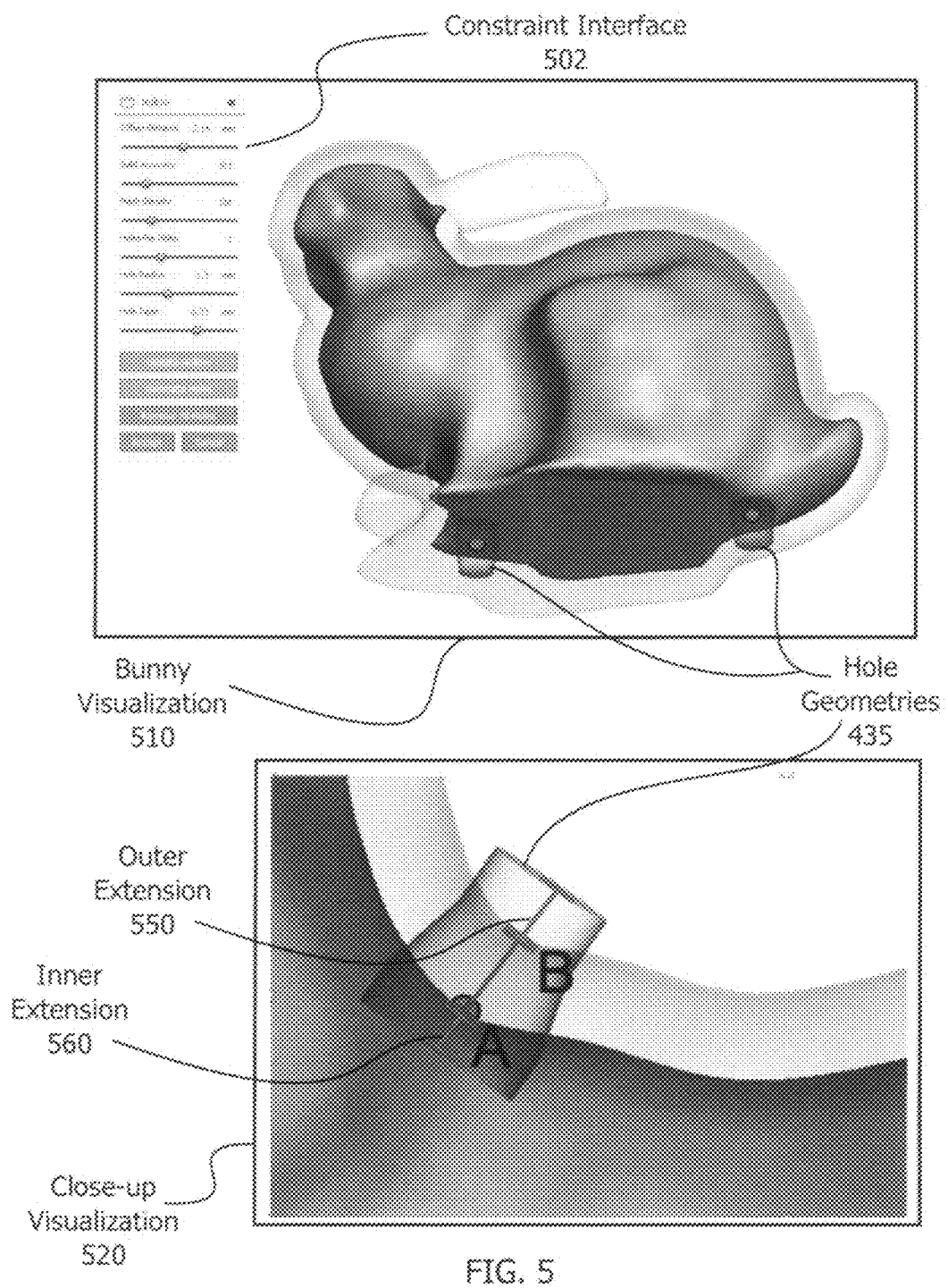
FIG. 5 is a conceptual illustration of the escape holes created by the escape hole generator of FIG. 2, according to one embodiment of the present invention.

FIG. 5 is a conceptual illustration of the escape holes 335 generated by the escape hole generator 230 of FIG. 2, according to one embodiment of the present invention. For discussion purposes only, the images depicted in FIG. 5 are snapshots of a GUI, such as the 3D model GUI 220, that enables user interaction with the escape hole generator 230.

As shown, a bunny visualization 510 includes an image of the 3D model 202 of a bunny, the hole geometries 435 superimposed on the 3D model 202, and a constraint interface 502. The constraint interface 502 includes user-configurable options such as the "holes per hollow," "hole radius," and "hole taper." As the user adjust these options, the escape hole generator 230 updates the hole geometries 435 and then the GUI updates the displayed hole geometries 435. Advantageously, such an interactive process enables the user to efficiently fine-tune the generated hole geometries 435.

A close-up visualization 520 depicts a magnified view of one of the hole geometries 435 generated by the escape hole generator 230. As shown, the hole geometry 435 has the basic shape of a tapered cylinder, with both an inner extension 560 and an outer extension 550 that ensure that the extraction tool 450 removes the desired material.

Figure 6A:
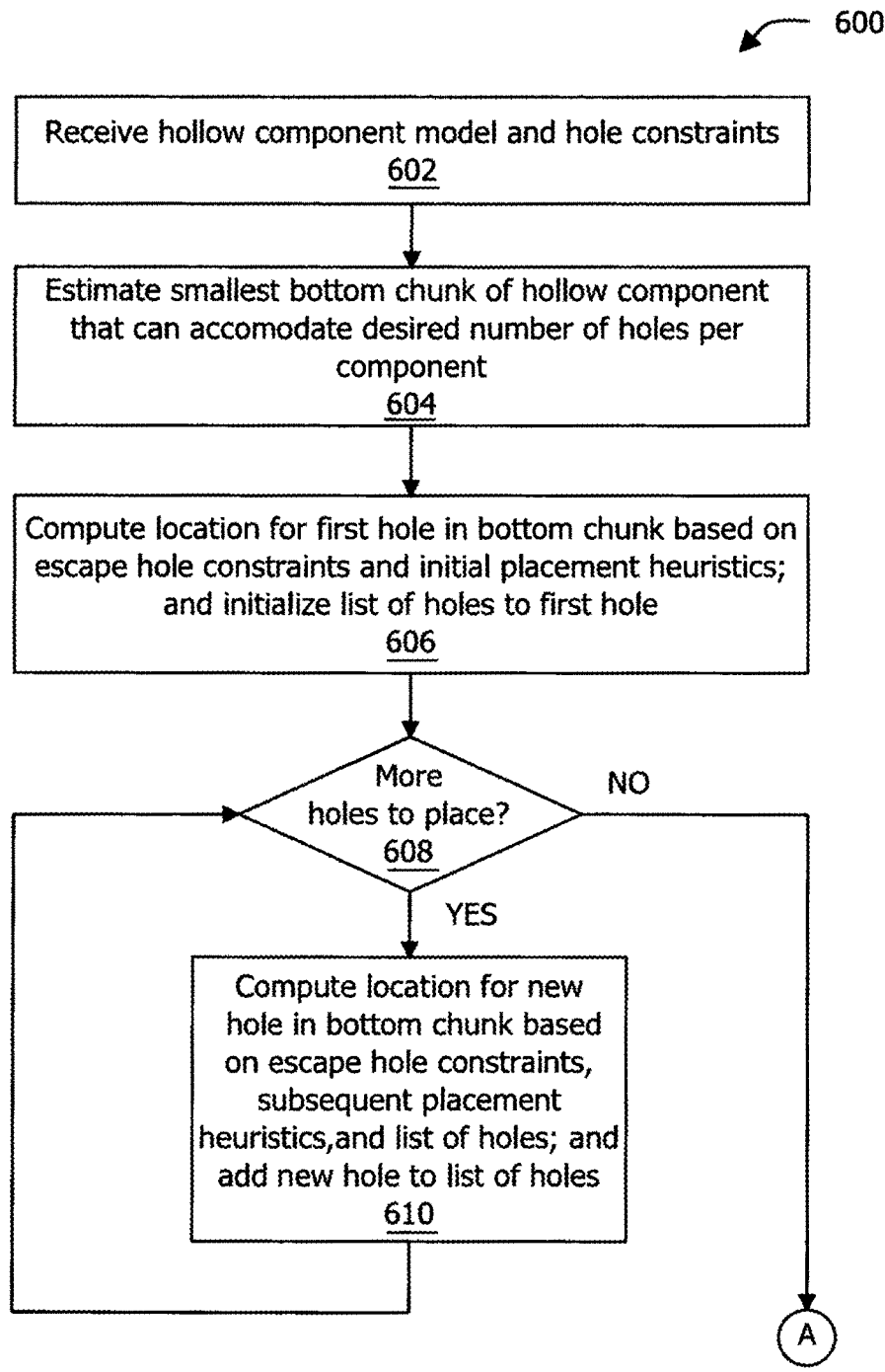
FIGS. 6A-6B set forth a flow diagram of method steps for adding escape holes to a 3D model, according to one embodiment of the present invention.
Figure 6B:
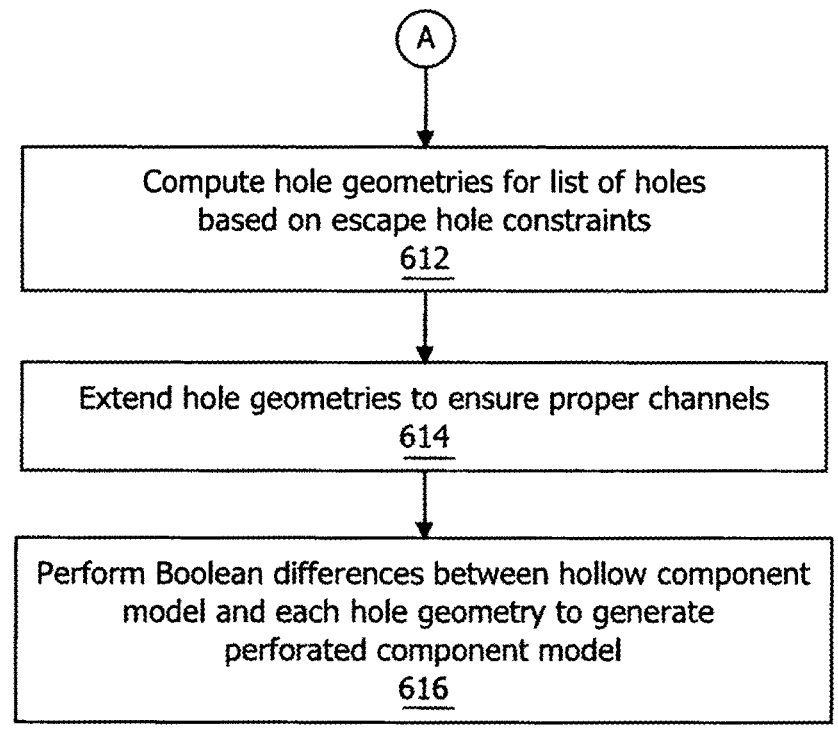

FIGS. 6A-6B set forth a flow diagram of method steps for adding escape holes to a 3D model, according to one embodiment of the present invention. Although the method steps are described with reference to the systems of FIGS. 1-5, persons skilled in the art will understand that any system configured to implement the method steps, in any order, falls within the scope of the present invention. For discussion purposes only, the 3D model 202 represents a single hollow component. In alternate embodiments, the 3D model 202 may depict any number of hollow components or regions and any number of solid components. The escape hole generator 230 is configured to perform the method steps for each hollow component or region specified in the 3D model 202.

As shown, a method 600 begins at step 602, where the escape hole generator 230 receives the 3D model 202 and the escape hole constraints 420. After receiving the 3D model 202, the escape hole generator 230 identifies the hollow component model 402 included in the 3D model. At step 604, the bottom chunk identifier 410 estimates the smallest bottom chunk 415 of the hollow component (based on the escape hole constraints 420, such as "hole radius") that is able to accommodate the specified "holes per hollow."

At step 606, the hole placement engine 430 computes the location of the first escape hole 335 designed to perforate the hollow component. The hole placement engine 430 determines this location based on both the escape hole constraints 420 and the initial placement heuristics 432. The hole placement engine 430 then initializes a list of holes to the location of first escape hole 335. If, at step 608, the hole placement engine 430 determines that the list of holes includes the specified number of holes per hollow, then the method 600 proceeds to step 612.

At step 608, if the hole placement engine 430 determines that the list of holes does not include the specified number of holes per hollow, then the method 600 proceeds to step 610. At step 610, the hole placement engine 430 computes the location of a new escape hole 335 designed to perforate the hollow component. The hole placement engine 430 computes this location based on both the escape hole constraints 420, the subsequent placement heuristics 434, and the list of holes (i.e., the previously selected locations of the escape holes 335). As part of step 610, the hole placement engine 430 adds the new location of the new escape hole 335 to the list of holes. The method 600 then returns to step 608, where the hole placement engine 430 assesses whether the list of holes includes the specified number of holes per hollow. The hole placement engine 430 cycles through steps 608-610, determining optimized locations of escape holes 335, until the hole placement engine 430 has placed the specified number of escape holes 335.

At step 612, the hole placement engine 430 computes hole geometries 435 for each of the escape holes 335 represented in the list o holes based on the escape hole constraints 420, including any user-specified preferences. More specifically, for the location of each of the escape holes 335, the hole placement engine 430 generates a corresponding hole geometry 435 that extends from the hole location of the escape hole 335 (specified on the inner shell 340 of the hollow component model 202) to the outer shell 330.

At step 614, the hole placement engine 430 modifies the hole geometries 435 to ensure that the proper channels are created in the wall of the hollow component. For example, if a particular escape hole 335 is located on a curved surface of the hollow component model 202, then the hole placement engine 430 may extend the corresponding hole geometry 435 to ensure that material in the wall of the hollow component does not compromise the escape hole 335. At step 616, the extraction tool 450 performs Boolean difference operations between the hollow component model 402 and each of the escape holes geometries 435 to create the perforated component model 492.

In sum, the disclosed techniques may be used to automate portions of the 3D object design process. More specifically, an escape hole generator modifies a 3D mesh that represents a hollowed version of the 3D object—perforating hollow components or regions with escape holes designed to enable removal of unprinted and/or support material generated during 3D printing. In operation, the hole placement engine within the escape hole generator implements heuristics to optimally select the number and locations of the escape holes. Typically, the heuristics favor placing escape holes towards the bottom of the 3D model while complying with both 3D printer and user constraints.

For each selected hole location, the escape hole generator then creates a hole geometry, such as a tapered cylinder, that connects the inner shell 340 of the hollow component or region with the outer shell 330 of the hollow component or region and is aligned along the surface normal to the inner shell 340 at the selected location. Notably, the escape hole generator optimizes the hole geometries based on both 3D printer requirements (e.g., minimum hole radius) and user preferences, such as a desired hole taper. Subsequently, the escape hole generator performs a Boolean difference between the 3D mesh and the hole geometries, thereby perforating the original 3D model with ergonomically-shaped escape holes at the selected locations of the escape holes 335.

Advantageously, automating escape hole generation reduces both the time required to design practical, hollow 3D meshes and the effort required to remove unprinted and/or support material created during 3D printing. In particular, designers may efficiently leverage hollowing techniques to reduce the amount of material, printing time, and weight of 3D objects without incurring unacceptable long design and/or manufacturing times associated with conventional, manual, escape hole generation. Further, unlike conventional interactive techniques, automatic escape hole generation enables automated flows to create hollow components or regions during 3D printing irrespective of whether GUI-based modelling tools are available.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

The invention claimed is:

1. A computer-implemented method for automatically placing one or more escape holes when printing a three-dimensional (3D) model, the method comprising:
   identifying a hollow region of the three-dimensional model;
   automatically determining, via an initial heuristic executed by a 3D modelling tool, a first location for a first escape hole based on the hollow region and one or more escape hole constraints;
   automatically generating, via the 3D modelling tool, the first escape hole to provide a channel from the interior of the hollow region to the exterior of the hollow region at the first location; and
   determining, via a subsequent heuristic, a second location of a second escape hole based on the hollow region, and the one or more escape hole constraints, wherein the subsequent heuristic determines that the second location of the second escape hole is geodesically furthest from the first location for the first escape hole.

2. The method of claim 1, further comprising:
   generating the second escape hole that provides a channel from the interior of the hollow region to the exterior of the hollow region at the second location.

3. The method of claim 1, wherein the hollow region is represented by a three-dimensional mesh, and generating the first escape hole comprises:
   generating hole geometry based on the first location; and
   performing a Boolean subtraction operation that perforates the three-dimensional mesh with the hole geometry.

4. The method of claim 3, wherein the first location is disposed on an inner shell of the hollow region, and generating the hole geometry comprises:
   calculating a surface normal to the inner shell at the first location;
   determining, based on the surface normal, a point on an outer shell of the hollow region where a ray intersects the outer shell; and
   generating a three-dimensional tubular object that spans from the first location disposed on the inner shell to the point on the outer shell and is aligned with an axis corresponding to the surface normal.

5. The method of claim 4, wherein the three-dimensional tubular object is a truncated cone that varies in diameter between a first radius at the inner shell to a second radius at the outer shell, wherein the second radius is less than the first radius.

6. The method of claim 4, wherein generating the hole geometry further comprises:
   identifying an infinite cylinder that is centered along the axis of the three-dimensional tubular object;
   selecting neighboring points, wherein the neighboring points are geodesically connected to the three-dimensional tubular object and lie within the infinite cylinder; and
   extending the three-dimensional tubular object to include the neighboring points.

7. The method of claim 1, wherein identifying the hollow region comprises identifying a shortest portion of the three-dimensional model that includes a lowest vertical point in the three-dimensional model and has a surface area large enough to accommodate a desired number of escape holes.

8. The method of claim 1, wherein the determining the first location comprises identifying the center of the bottommost inner shell of the hollow region.

9. The method of claim 1, wherein the one or more escape hole constraints includes a predetermined number of escape holes per hollow region, and identifying the hollow region comprises identifying a smallest portion of the three-dimensional model having a surface area large enough to include the predetermined number of escape holes per hollow region.

10. The method of claim 1, wherein the one or more escape hole constraints include a predetermined number of escape holes per hollow region and a predetermined radius for each escape hole.

11. The method of claim 10, wherein identifying the hollow region comprises identifying a smallest portion of the three-dimensional model having a surface area large enough to include the predetermined number of escape holes per hollow region, each escape hole having the predetermined radius.

12. The method of claim 1, wherein the initial heuristic and the subsequent heuristic are executed by the 3D modelling tool that incorporates locations of proceeding escape holes to determine a location for a subsequent escape hole.

13. The method of claim 1, wherein the initial heuristic and the subsequent heuristic are executed by the 3D modelling tool that determines locations of escape holes sequentially.

14. The method of claim 1, wherein the initial heuristic determines that the first location for the first escape hole is a geodesic center of the hollow region.

15. A computer-implemented method for automatically placing one or more escape holes when printing a three-dimensional (3D) model, the method comprising:
- identifying a hollow region of the 3D model;
- automatically determining, via a 3D modelling tool, a first location for a first escape hole based on the hollow region, an initial heuristic, and one or more escape hole constraints that include a predetermined number of escape holes per hollow region, wherein identifying the hollow region comprises identifying a smallest portion of the 3D model having a surface area large enough to include the predetermined number of escape holes per hollow region; and
- automatically generating, via the 3D modelling tool, the first escape hole to provide a channel from the interior of the hollow region to the exterior of the hollow region at the first location.

16. The method of claim 15, wherein the one or more escape hole constraints further include a predetermined radius for each escape hole.

* * * * *